United States Patent
Jones et al.

(10) Patent No.: US 8,028,396 B2
(45) Date of Patent: Oct. 4, 2011

(54) AUTOMATIC WIRE WINDING OF INSIDE BRUSHLESS STATOR

(75) Inventors: Robert M. Jones, Brooksville, FL (US); Joseph M. Lisiecki, Springhill, FL (US)

(73) Assignee: Robert M. Jones, Brooksville, FL (US)

( * ) Notice: Subject to any disclaimer, the term of this patent is extended or adjusted under 35 U.S.C. 154(b) by 1120 days.

(21) Appl. No.: 11/825,847

(22) Filed: Jul. 9, 2007

(65) Prior Publication Data

US 2008/0016672 A1    Jan. 24, 2008

Related U.S. Application Data

(60) Provisional application No. 60/831,508, filed on Jul. 18, 2006.

(51) Int. Cl.
*H01S 4/00* (2006.01)
(52) U.S. Cl. .......... 29/592.1; 29/596; 29/602.1; 29/605; 29/606; 140/92.1; 242/432.3
(58) Field of Classification Search ............... 29/592.1, 29/596, 602.1, 605, 606; 140/92.1; 242/432.3
See application file for complete search history.

(56) References Cited

U.S. PATENT DOCUMENTS

| | | | |
|---|---|---|---|
| 3,809,990 A | | 5/1974 | Kuo et al. |
| 3,903,933 A | * | 9/1975 | Arick et al. ............... 140/92.1 |
| 3,985,163 A | * | 10/1976 | Vogel et al. ............... 140/92.1 |
| 4,290,190 A | * | 9/1981 | Arnold ........................ 29/596 |
| 4,498,636 A | * | 2/1985 | Boesewetter et al. ..... 242/432.3 |
| 4,817,256 A | | 4/1989 | Riti et al. |
| 5,025,997 A | | 6/1991 | Shi et al. |
| 5,549,253 A | * | 8/1996 | Beakes et al. ............. 242/432.3 |
| 5,964,429 A | * | 10/1999 | Burch et al. ............... 242/432.2 |
| 6,032,897 A | | 3/2000 | Ponzio |
| 6,538,356 B1 | | 3/2003 | Jones |

* cited by examiner

*Primary Examiner* — Carl Arbes
(74) *Attorney, Agent, or Firm* — Hamilton, Brook, Smith & Reynolds, P.C.

(57) ABSTRACT

A method and mechanism for automatic or manual winding of a stator. A fixed arbor serves to support the stator during the winding process, as well as a wire feed point and wire guide. A mechanism moves the stator in a back and forth motion along the major axis of the arbor. Proper axial position of the wire is maintained by the outer surface of the arbor and the axial slot itself. The arbor has a channel that serves to guide the wire, allowing it exit in each of the two possible longitudinal directions along the major axis of the arbor.

23 Claims, 4 Drawing Sheets

AUTOMATIC WIRE WINDING OF INSIDE BRUSHLESS STATOR

CROSS REFERENCE TO RELATED PATENT APPLICATIONS

This application claims the benefit of U.S. Provisional Patent Application Ser. No. 60/831,508 filed on Jul. 18, 2006. The entire teachings of the above application are incorporated herein by reference.

BACKGROUND OF THE INVENTION

The present disclosure relates to the manufacture of electric machines, such as a motor or generator, and in particular to a machine that automates wire winding of a stator.

One common type of electric machine is a brushless Direct Current (DC) motor that includes two major elements, a stator and a rotor. The stator typically includes a wire coil having a number of windings. The rotor typically includes permanent magnets. The rotor and stator are arranged such that the rotor can move freely with respect to the mechanically fixed stator. As a result, electromagnetic interaction between the stator and the rotor causes the rotor to move in response to polarity changes in the stator windings.

One common design has the rotor embedded as a shaft that turns inside a cylindrical stator. The rotor assembly typically includes a number of permanent magnets placed about a shaft. The magnets are held on the shaft by an outer sleeve. The rotor assembly is rotatively supported within the cylindrical stator housing via low friction bearings.

The stator is often made by laminating a number of disks formed of a ferrous material to form a "back iron." The disks typically have a center hole with tines formed therein. The laminated stack of disks provides a set of axial slots around which are wrapped copper wire strands to form the motor windings.

It can be appreciated that much of the cost to manufacture an inside wound motor is due to the need to wrap wires around and/or within the axial slots of the stator.

A number of somewhat elaborate machines have been devised to automatically wind a stator. In one common approach, windings are formed by a head that comprises a hollow needle through which a wire strand slides. The needle is supported and controlled by an apparatus to reciprocate within and parallel to the axis of the stator. The needle is thus caused to move about the slots, following a substantially elliptical path. The winding needle(s) are operated by a complex series of mechanical drives and gears to follow the required path. See the machines shown in U.S. Pat. No. 6,032, 897 and U.S. Pat. No. 4,817,256, which are herein incorporated by reference in its entirety.

In an approach described in U.S. Pat. No. 5,025,997, which is herein incorporated by reference in its entirety, the stator is held within a fixture such that it can be rotated through a predetermined angle. A wire stopper is attached to one or more ends of the stator. The wire guiding member is slidably supported by a pair of bearings, and driven by a mechanism, so that it is moved periodically through the central hole of the stator, external of the wire stoppers. This winding apparatus requires various components including a stationary frame, a moveable frame, several wire feeding/carrying means, and a wire guiding member fixed to the stationary frame.

SUMMARY OF THE INVENTION

The present disclosure is a simplified method and mechanism for automatic winding of motor stators. According to the present disclosure, a fixed arbor serves to support the stator during the winding process, as well as a wire feed point (an elliptical port), and wire guide. A mechanism moves the stator in a simple back and forth and radial motion along the major axis of the arbor. Proper axial position of the wire is maintained by the outer surface of the arbor and the elliptical port itself. The arbor has a passage that serves to guide the wire, allowing it exit in each of the two possible longitudinal directions along the major axis of the arbor. As the wire/s is pulled into the corners of the ellipse or "eye shaped" vortex of the arbor exit port, it is gathered tightly into a shape suitable to enter the stator slot.

Several wires can be wound all at once. The prototype arbor has successfully wound 65 wires in a ¼" bundle into a stator slot at the same time. This is a radical improvement. It is also possible to wind with a single wire using this disclosure but the best logical application is to use several individual wires from several spools at the same time to expedite the process.

In a process to wind a stator, wire is first fed through one end of the arbor to the feed point. The stator is then turned axially on the arbor so that a first slot is aligned with the feed point. The stator is then moved longitudinally along the arbor, such that the selected slot remains parallel in an appropriate position with the feed point, and so that the wire is fed into the slot. When the stator reaches the other end of the arbor, the stator is turned to the next axial position and then moved back in the opposite direction along the arbor. The process is then repeated to form the desired number of windings.

In this manner, windings are easily formed on the stator with a minimal complexity mechanism.

Among other advantages are that because the slot in the stator and the outer surface of the arbor naturally provide a guided channel path for the wire, when used in a manual application, no additional wire feeding or wire guiding mechanisms are required. Stators can be assembled in a radial twist or "skew" as it is typically referred to and the stator is guided on this helical path by the wire or bundle of wires as it is inserted into the stator in a manual application. A servomotor dictates this helical path in an automatic application.

According to a first embodiment of the present disclosure, there is provided a method to manufacture a wound stator for an electric motor. The method includes the steps of providing an arbor with an opening, and providing a stator including notches. The stator is positioned relative to the arbor to align a first notch with the opening. The arbor or the stator is moved to lay a conductive material in the first notch.

The stator or the arbor is then rotated to align a second notch with the opening. The arbor is moved relative to the stator to lay the conductive material in the second notch. The method may further include the step of moving the stator, or the arbor relative to one another in a manual manner, or in an automatic manner.

The arbor, and the stator can be cylindrically shaped, or have other shapes. The method may further include providing a conductive wire as the conductive material, or a wire bundle as the conductive material. The method lays a predetermined number of windings of the conductive material in the stator with the predetermined number of windings of the conductive material corresponding to a predetermined number of turns for the electric motor for torque and for power. These turns are be closely located to the permanent magnets of a rotor in operation.

The method may further provide the arbor with an outer diameter, which is measured smaller than an inner diameter of the stator. The arbor has a size that is configured to freely traverse into, and out of the stator to lay the wire bundle. The method further includes providing the arbor with a channel formed therein with the conductive material fed in tension through the channel to the opening.

In another, alternative, and preferred embodiment, the method further can include providing the arbor with a member inserted therein. The member has a channel. The channel communicates with the opening of the arbor. This channel facilitates insertion of the tensioned conductive material through the arbor, the member, and through the opening. Alternatively, the stator can be provided with notches formed around an inner surface of the stator. The notches can be curved or straight relative to a longitudinal axis of the stator.

The method may further include moving the arbor or the stator to lay the conductive material in the third notch, and rotating the stator or the arbor to align a fourth notch with the opening. The arbor can be then moved relative to the stator to lay the conductive material in the fourth notch. The method can further lay the conductive wire bundle in other notches, and is not limited to the number described above. The notches may be formed around an outer surface of the stator, instead of around the inner surface.

A method to manufacture an electric motor is also provided that includes providing a rotor having magnets. The method also provides an arbor. A conductive material extends outside of the arbor at a first end. The conductive material is laid into at least one notch of a stator.

The conductive material is tensioned through a channel formed through the arbor from a conductive material feeder. The stator includes notches, and the stator is positioned relative to the arbor to align a first notch with the conductive material. The arbor or stator is moved to lay the conductive material in the first notch, and then the stator or the arbor is rotated to align the conductive material with a second notch. The conductive material extends outside of the arbor at the first end. The arbor or the stator is moved to lay the conductive material in the second notch to provide the wound stator.

The rotor is supported in the stator to form the electric motor. The rotor may have permanent magnets in a sheath, which surrounds the rotor. The conductive wire is then cut when the stator is nearly completely wound. A wire retainer can be introduced into the notches with the conductive wire bundle in at least one of the notches to secure the conductive wire bundle in the notches of the stator. The retainer can be insulation, a potting, or a glass reinforced plastic, or any other suitable adhesive to secure the conductive wire bundle in the notches of the stator.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

Figure 1:
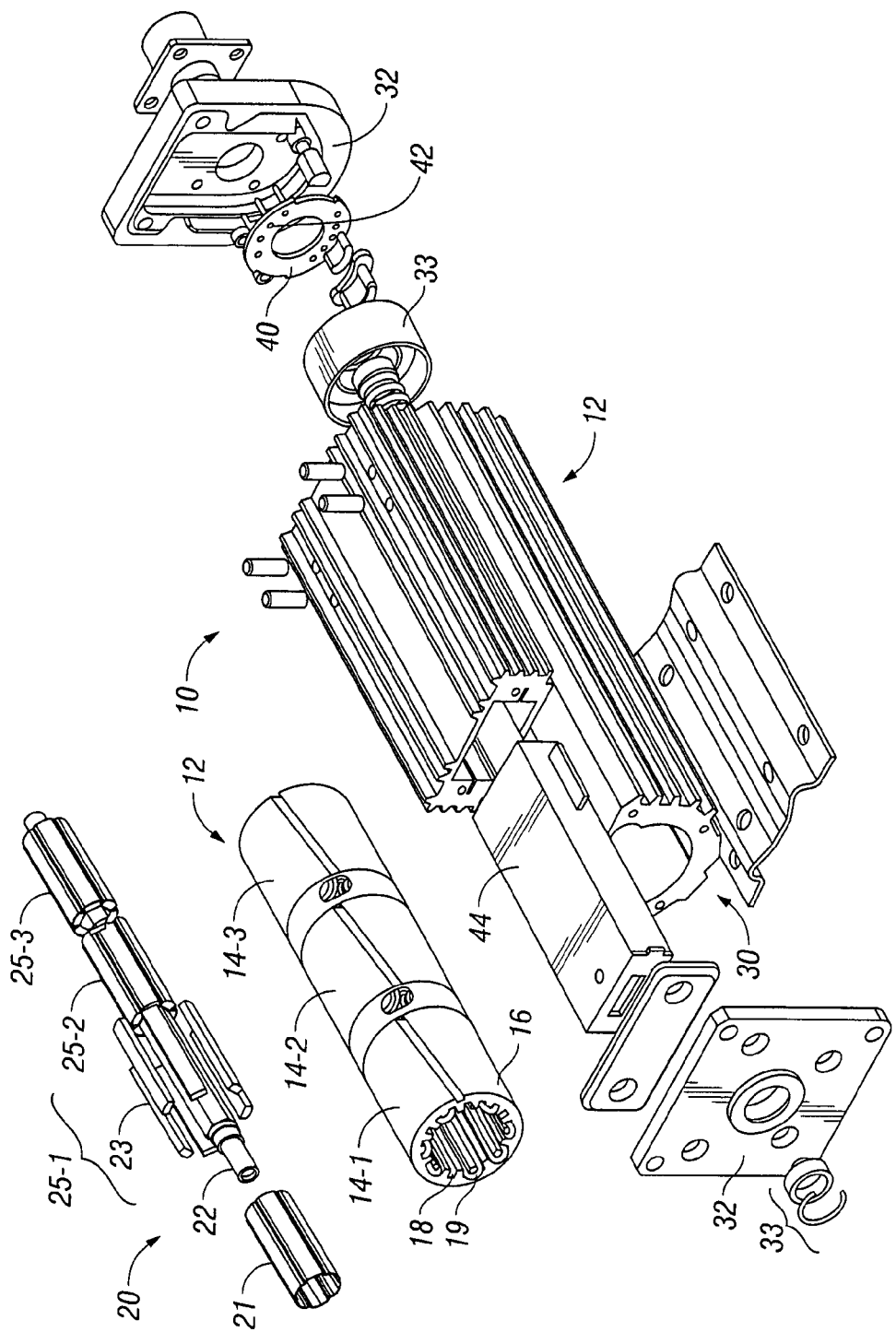
FIG. 1 is an exploded, isometric view of the components of one type of motor that can be made according to the present disclosure.

FIG. 1 is an exploded view of one type of motor 10 that can be made according to the present disclosure. The motor 10 has a stator 12 and rotor 20. The stator 12 in the illustrated example has three (3) stator sections numbered 14-1, 14-2, and 14-3, one stator for each operating phase. It will be understood, however, that fewer or more stator sections might be provided.

The motor 10 is of the inside DC brushless type, in which the rotor 20 is disposed along a central axis to turn inside of the stator 12. The rotor 20 and stator 12 assemblies are held in relative position with respect to one another by motor housing 30 and by end plates (frames) 32. The housing 30 and frames 32 may be formed of aluminum, steel, or other suitable metal. The rotor assembly 20 is held in place on frame 32 via front and rear bearings 33, on which the rotor also freely rotates.

The rotor assembly 20 includes outer sleeves 21, an inner rotor shaft 22, and a number of magnet bars 23. The rotor 20 actually arranges magnet sections 23 in three rotor sections 25-1, 25-2, 25-3 in the illustrated embodiment. Thus, there is a front rotor section 25-1, a center rotor section 25-2, and rear rotor section 25-3. Each magnet section 23 electromagnetically interacts with the corresponding one of the stator sections 14. The permanent magnets 23 may be enclosed in a sheath, such as outer sleeve 21, which may be made of a non-magnetic material such as stainless steel. The sheath may be crimp-formed or otherwise secured around the magnets to hold them in place, which may be required when high speed operation would produce radial forces that would cause the magnets to separate from the rotor shaft.

The stator sections 14 each comprise a cylindrical back iron assembly 16, having a number of internal tines and windings 19. As is known in the art, the back iron 16 may be built up from a number of flat disk-like pieces that are laminated to one another tines provide a set of radial slots 18 into which wire is wound. The windings 19 provide the desired number of turns for the motor 10.

Figure 2:
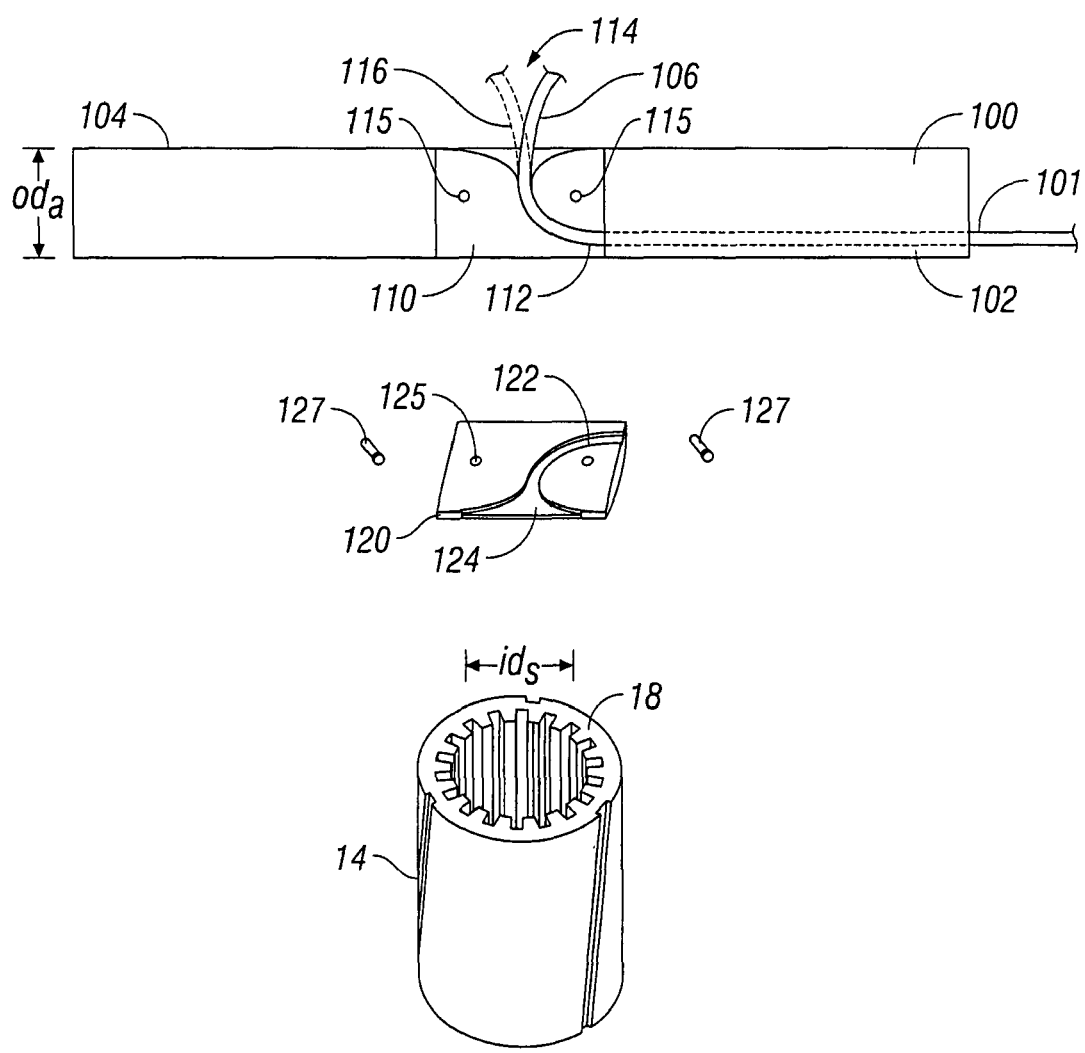
FIG. 2 is a diagram illustrating the components of a wire winding apparatus according to the disclosure.

The present disclosure specifically involves an apparatus and method for placing the windings 19 within the stator section 14. The present disclosure utilizes a fixed arbor 100 which supports the stator 14 during the winding process, as shown in FIG. 2. The main body of the arbor 100 is generally an elongated cylinder having three sections. Note that the outer diameter ODa of the arbor 100 is only slightly smaller than the inner diameter IDs of the stator 14. The difference in diameters is small enough so that the resulting space can contain and guide the wire 101 through axial slots 18 during the winding process. This permits the arbor 100 to be used as both the support for a stator 14 and as a guide for the wire bundle 101 as it is passed through axial slots 18. A first section 104 and second section 102 serve as supports for the stator 14 and guides for the wiring during the process. The second section 102 has at least one hollow portion 102 therein such that a wire or wire bundle 101 can be fed through to a center section 110.

The end of the first section 104 of the arbor 100 is generally the supported end and the end of second section 102 is generally a free end, although either end 102 or 104 of the arbor can be the supported end or free end. It may make more sense to have end 102 be the supported end as that can provide for continuous feed from the wire tensioner, as will be understood.

The center section 110 of arbor preferably has a channel 112 formed therein through which the wire 101 is fed. Wire 101 is held under tension via tensioner to the right of arbor section 100 (not shown in the drawings).

The wire 101, which is used to form the windings for stator 14 is fed at a feed point 114 in a way that it can be easily led out of the channel 112 in one of two directions 106, 116, towards first section 104 or second section 102. The first direction 116 is generally towards section 104 (to the left in the drawing) and the second direction 106 is towards section 102 (to the right in the drawing). The channel 112 has shaped end taper portions to allow the wire bundle 101 to freely move between position 106 and 116.

A channel section 120 generally forms the remainder of the cylinder to form the completed arbor 100, and has a corresponding channel 122 and feed point 124 that generally mirrors the corresponding channel 112 and feed point 114 in the main body portion of the arbor 100. Fasteners such as screw holes 115, 125 are formed in the arbor 100 and section 120 to permit the fastening section 120 via fasteners 127 such as screws. The channel section facilitates insertion of the wire 101 in the channel 112.

Figure 3:
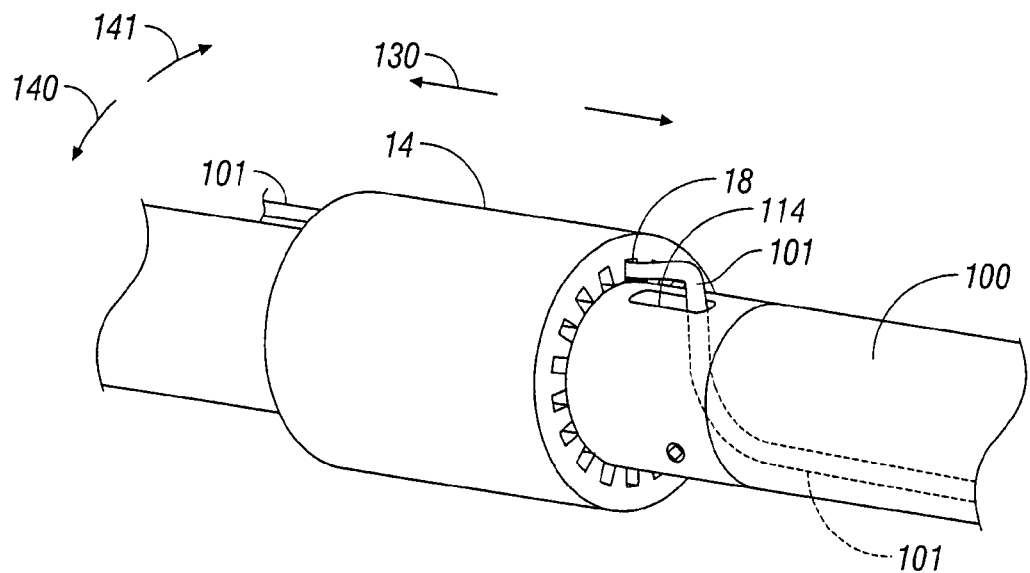
FIG. 3 illustrates the stator in an initial position on the arbor.

FIG. 3 shows an initial starting step of the stator winding process. Here the stator 14 has been placed on the arbor 100. In this initial position, the wire bundle 101 has been led out to a far end portion of the arbor section 104. The stator 14 was then fed on the arbor in the direction of the arrow 130 from starting end 100. During this process the stator 14 was aligned with the feed point 114 such that the wire bundle 101 is fed through one of the axial slots 18.

In the next step of the process, the stator 14 is rotated with respect to the arbor 100 to cause the feed point 114 (and hence wire 101) to be aligned with a different slot 18. The stator 14 is generally moved in one of a counter clockwise 140 or clockwise 141 direction on the arbor 100 to accomplish this. At this point, the stator 14 is then drawn back along the arbor towards the right in the direction of arrow 131.

Figure 4:
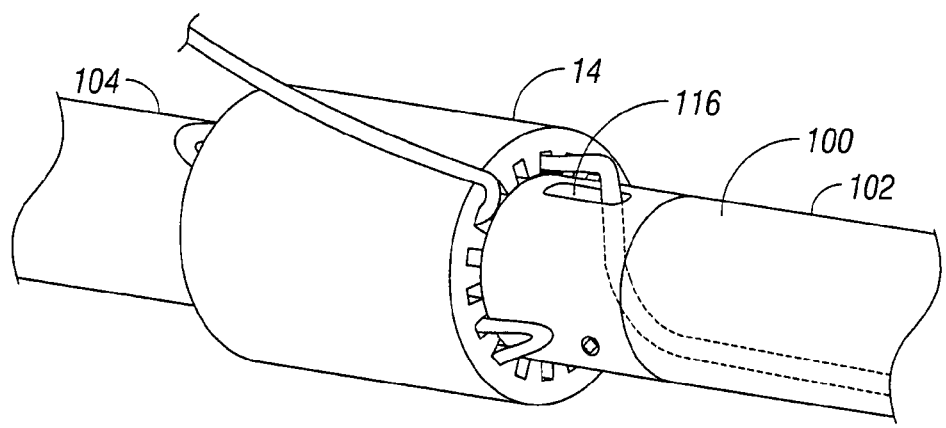
FIG. 4 shows the apparatus after two back and forth passes of the stator over the arbor have been made.

The stator 14 is then alternately drawn back and forth in the direction of arrows 131, then 130, then 131 etc. rotating to align with a different slot each pass. The stator alternately takes up a position on the first portion 104 of the arbor 100 as shown in FIG. 4, and a second position along the second section 102 of the arbor 100 as shown in FIG. 5.

Figure 5:
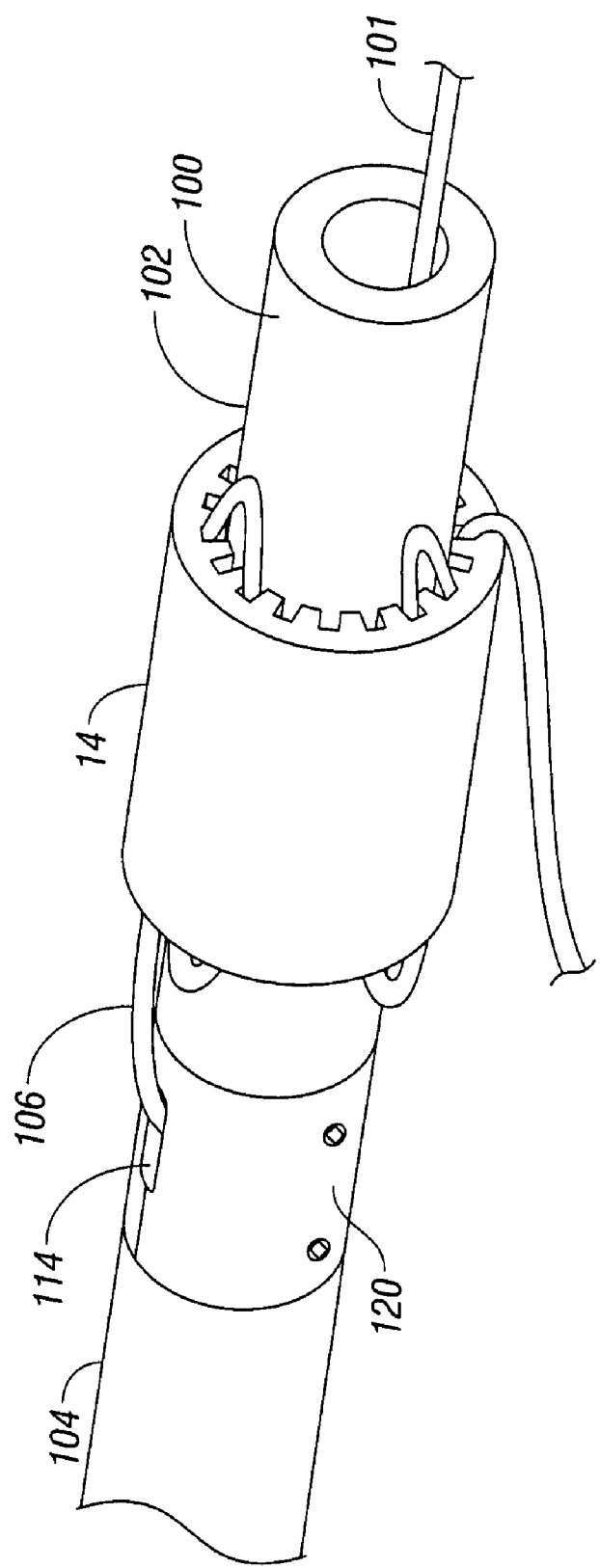
FIG. 5 illustrates the completed stator before the wire end is cut.

FIG. 5 illustrates a position of the stator 14 when it is nearly completely wound, at which point a cut can be made of the wire bundle 101 at some point beyond the feed point 114. The wound stator is then moved slightly off of the end of the arbor where wire retainers of an insulating, glass reinforced plastic are installed in the provided passage of the back iron to retain the wires. This can be done manually or as an automatic function of a fully automated machine. The wound stator can also be off-loaded on to another arbor of equal diameter that is held end to end with the winding arbor to maintain capture of the wires while in transit to a plastic loading portion of the automatic machine or used as a hand tool for an operator that is used to off-load the wound stator to be manually loaded with the plastic retainers while the automatic machine is winding the next stator.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method to manufacture a stator, the method comprising:
   providing a member with an opening at a central portion of the member;
   providing a conductive material through the opening;
   providing a stator including a notch therein;
   inserting the member into the stator and positioning the stator relative to the member to align the notch with the opening and the provided conductive material, an outer surface of the arbor and the notch providing a first guided channel path for the conductive material; and
   moving at least one of the member and the stator in a lengthwise manner to lay the conductive material in the first notch via the first guided channel path, and rotating the member relative to the stator to align the opening with a second notch, the outer surface of the arbor and the second notch providing a second guided channel path for the conductive material, and moving at least one of the member and the stator in a lengthwise manner to lay the conductive material into the second notch via the second guided channel path.

2. The method of claim 1, further comprising introducing a wire retainer into the plurality of notches with the conductive material in the notches to secure the conductive material in the notches of the stator.

3. A method to manufacture a component of an electric device, the method comprising:
   providing a member comprising an opening at a central portion of the member;
   providing a conductive material via the opening;
   providing the component comprising a notch;
   inserting the member in the component and aligning the notch with the opening, an outer surface of the member and the notch providing a first guided channel path for the conductive material;
   laying a conductive material in the notch via the first guided channel path by moving at least one of the member and the component in a lengthwise manner; and
   laying the conductive material in at least a second notch of the component by rotating at least one of the member and the component relative to one another, and moving at least one of the member and the component in a lengthwise manner.

4. The method of claim 3, wherein the electric device is a generator, a stator, an alternator, or any other electric component of a motor, or generator.

5. A method to manufacture an electric motor, the method comprising:
   providing a rotor having magnets;
   providing a stator including a plurality of notches;
   providing an arbor having a conductive material extending through a channel formed through the arbor from a first opening at an end of the arbor to a second opening at a central portion of the arbor with the conductive material protruding from the second opening, the conductive material tensioned by a conductive material feeder;
   positioning the arbor in the stator to align a first notch with the second opening of the arbor and the protruding conductive material, an outer surface of the arbor and the first notch providing a first guided channel path for the conductive material;
   moving lengthwise at least one of the arbor and stator to lay the conductive material in the first notch via the first guided channel path;
   rotating at least one of the stator and the arbor to align second opening of the arbor and the protruding conductive material with a second notch, the outer surface of the arbor and the notch providing a second guided channel path for the conductive material;

moving lengthwise at least one of the arbor relative to the stator to lay the conductive material in at least the second notch to provide the wound stator via the second guided channel path; and supporting the rotor in the stator.

6. The method of claim 5, wherein providing a rotor having magnets comprises providing a plurality of permanent magnets provided in a sheath surrounding the rotor.

7. The method of claim 5, wherein the conductive material in the plurality of notches comprises a conductive wire bundle.

8. The method of claim 7, further comprising cutting the conductive wire bundle when the stator is nearly completely wound.

9. The method of claim 8, further comprising introducing a wire retainer into the plurality of notches with the conductive wire bundle in at least one of the notches to secure the conductive wire bundle in the notches of the stator.

10. The method of claim 9, further comprising introducing at least one of an insulation, a potting, and a glass reinforced plastic to secure the conductive wire bundle in the notches of the stator.

11. A method to manufacture a wound stator for an electric motor, the method comprising:

providing an arbor with an interior channel, the channel terminating at a first opening at an end of the arbor and at a second opening at a central portion of the arbor;

providing a stator including a plurality of axial formed notches therein;

passing a conductive material through the arbor channel from the first opening to the second opening with the conductive material protruding from the second opening;

positioning the arbor in the stator to align a first notch with the second opening of the arbor and the protruding conductive material, an outer surface of the arbor and the notch providing a first guided channel path for the conductive material;

moving at least one of the arbor relative to the stator to lay the conductive material in the first notch via the first guided channel path;

rotating at least one of the stator and the arbor to align a second notch with the second opening of the arbor and the protruding conductive material, the outer surface of the arbor and the notch providing a second guided channel path for the conductive material; and moving the arbor relative to the stator to lay the conductive material in the second notch via the second guided channel path.

12. The method according to claim 11, further comprising moving at least one of the stator and the arbor relative to one another in a manual manner.

13. The method according to claim 11, further comprising moving at least one of the stator and the arbor relative to one another in an automatic manner.

14. The method according to claim 11, wherein providing an arbor comprises providing a cylindrical shaped arbor.

15. The method according to claim 11, wherein providing a stator comprises providing a cylindrical shaped stator.

16. The method according to claim 11, wherein the conductive material comprises a conductive wire.

17. The method according to claim 11, wherein the conductive material comprises a conductive wire bundle.

18. The method of claim 11, further comprising laying a predetermined number of windings of the conductive material in the stator with the predetermined number of windings of the conductive material corresponding to a predetermined number of turns for the electric motor.

19. The method of claim 11, further comprising providing the arbor with an outer diameter smaller than an inner diameter of the stator, the arbor having a size configured to freely traverse into, and out of the stator.

20. The method of claim 11, wherein the conductive material through the channel is under tension.

21. The method of claim 11, wherein the axial formed notches are formed on an inner surface of the stator; and optionally further comprising: providing that at least one of the plurality of notches is curved or straight relative to a longitudinal axis of the stator.

22. The method of claim 11, further comprising rotating at least one of the arbor relative to the stator to align a third notch with the second opening of the arbor and the protruding conductive material, the outer surface of the arbor and the third notch providing a third guided channel path for the conductive material;

moving the arbor relative to the stator to lay the conductive material in the third notch via the third guided channel path;

rotating at least one of the stator and the arbor to align a fourth notch with the second opening and the protruding conductive material, the outer surface of the arbor and the fourth notch providing a fourth guided channel path for the conductive material; and moving the arbor relative to the stator to lay the conductive material in the fourth notch via the fourth guided channel path.

23. A method to manufacture a wound stator comprising:

providing an arbor having a generally cylindrical shape and of a determined outer diameter, the arbor having a channel terminating at a first opening at an end of the arbor and at an elliptical port, a wire bundle fed through the channel from the first opening and protruding from the elliptical port;

providing a stator having an interior opening of a generally cylindrical shape with a plurality of axial slots formed therein with an inner diameter slightly larger than the outer diameter of the arbor so as to maintain capture of the wire;

positioning the stator on a first end of the arbor to align a first one of the axial slots with the elliptical port and the wire bundle protruding from the elliptical port, an outer surface of the arbor and the first one of the axial slots providing a first guided channel path for the conductive material;

passing the stator arbor from the first end past the feed point port to a second end of the arbor to lay the wire bundle in the first one of the axial slots via the first guided channel path;

rotating the stator to align a second axial slot with the elliptical port and the wire bundle protruding from the elliptical port, the outer surface of the arbor and the first one of the axial slots providing a second guided channel path for the conductive material; and passing the stator along the arbor from the second end past the feed port to the first end to lay the wire bundle in the second axial slot via the second guided channel path;

manually, or in a motor driven automatic machine.

* * * * *